(12) United States Patent
Watanabe

(10) Patent No.: US 8,478,090 B2
(45) Date of Patent: Jul. 2, 2013

(54) OPTICAL WAVEGUIDE DEVICE AND MANUFACTURING METHOD OF OPTICAL WAVEGUIDE DEVICE

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 315 days.

(21) Appl. No.: 13/034,923

(22) Filed: Feb. 25, 2011

(65) Prior Publication Data

US 2011/0229075 A1  Sep. 22, 2011

(30) Foreign Application Priority Data

Mar. 19, 2010 (JP) .................................. 2010/64473

(51) Int. Cl.
*G02B 6/26* (2006.01)
(52) U.S. Cl.
USPC .................. 385/31; 385/14; 385/15; 385/22; 385/24; 385/27
(58) Field of Classification Search
USPC ................. 385/14, 15, 22, 23, 24, 27, 28, 31, 385/39
See application file for complete search history.

(56) References Cited

U.S. PATENT DOCUMENTS

| | | | | |
|---|---|---|---|---|
| 5,703,975 | A  * | 12/1997 | Miller et al. | ..................... 385/16 |
| 7,174,069 | B2 * | 2/2007 | Shahar | ............................. 385/37 |
| 2013/0011093 | A1 * | 1/2013 | Goh et al. | ......................... 385/3 |

OTHER PUBLICATIONS

T. Hashimoto et al., "Dual polarization optical hybrid module using planar lightwave circuit", The Institute of Electronics, Information and Communication Engineers, Electronic Society Conference, 2009, pp. 194.

* cited by examiner

*Primary Examiner* — Jennifer Doan

(57) ABSTRACT

A 90-degree optical hybrid interferometer having an optical path length difference to a pair of the optical signal waveguide arm and the local oscillator optical waveguide arm at either the I phase side or the Q phase side at the TE optical signal side and the TM optical signal side respectively thus giving a phase delay to output interference signals of the I phase side and the Q phase side. The 90-degree optical hybrid interferometer has eight output ports arranged in order of Ip, In, Qp, and Qn at both the TE side and the TM side respectively, by setting the output phase difference which is the sum of the phase difference according to the optical path length difference and phase conversion characteristics of each optical coupler at the I phase side and the Q phase side and the phase delay, as $+\pi/2$.

10 Claims, 9 Drawing Sheets

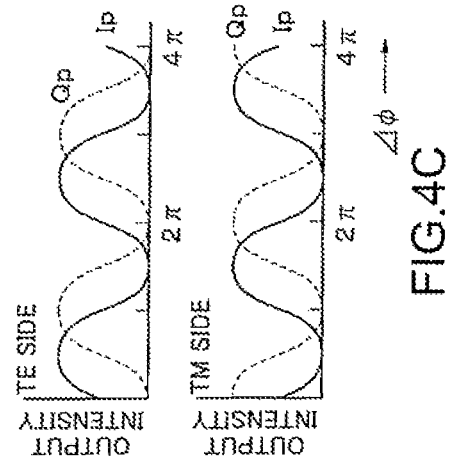
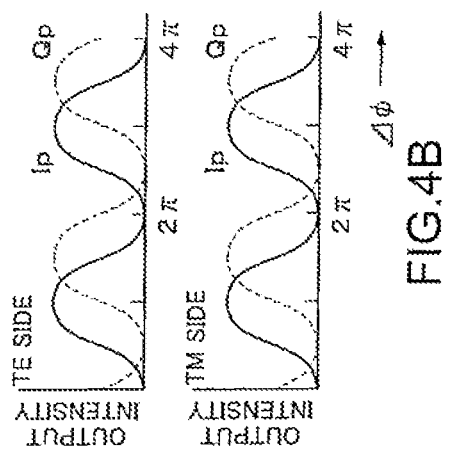
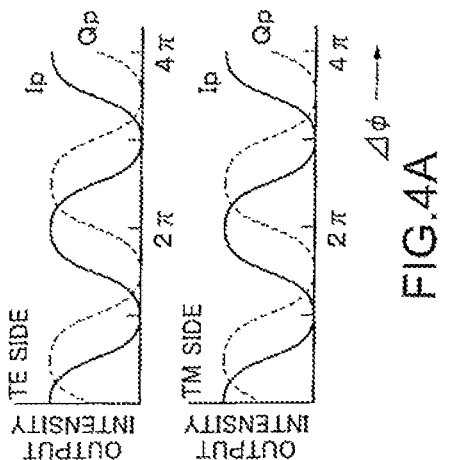
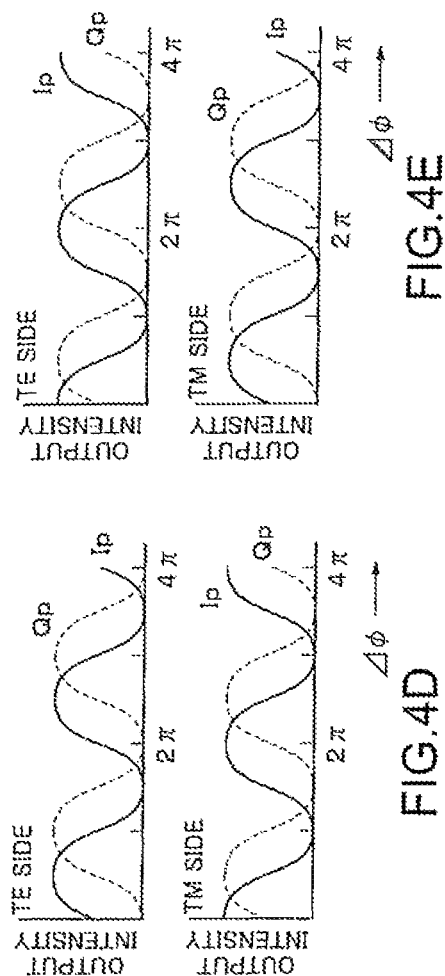
FIG.4A  FIG.4B  FIG.4C  FIG.4D  FIG.4E

OPTICAL WAVEGUIDE DEVICE AND MANUFACTURING METHOD OF OPTICAL WAVEGUIDE DEVICE

This application is based upon and claims the benefit of priority from Japanese Patent Application No. 2010-064473, filed on Mar. 19, 2010, the disclosure of which is incorporated herein in its entirety by reference.

TECHNICAL FIELD

The present invention relates to an optical waveguide device, and in particular to a 90-degree optical hybrid interferometer composed of a planar lightwave circuit using optical waveguide technology.

BACKGROUND ART

In ultrahigh-speed communications exceeding 100 Gbit/second, recent interest has been focused on a communication technology by DP-QPSK (Dual Polarization Differential Quadrature Phase Shift Keying) excelling in wavelength use efficiency, receiving characteristics, and dispersion compensation capability. A receiver for DP-QPSK system requires function to separate optical signal into polarized waves, and 90-degree optical hybrid function for retrieving phase information from the polarized waves. The phase information hereof is phase information of four values on I-Q plane: Ip and In having a phase difference of $\pi$, and Qp and Qn having a phase difference of $\pi/2$ to Ip and In respectively.

Receivers having such functions are becoming the standard in OIF (Optical Internetworking Forum), an industry group promoting high-speed data communications. For example, the specification of sequences of a port which outputs eight output signals is decided in OIF, and receivers are developed in accordance with the specifications of OIF.

Incidentally, it is said that a planar lightwave circuit using optical waveguide technology is influential for manufacturing a device which realizes the function of the receiver of such DP-QPSK system. Optical waveguide technology is for forming optical waveguides of various shapes on a substrate by the same micro fabrication technology as the semiconductor integrated circuit manufacturing process, and it is appropriate for integration or for mass production.

Receivers of DP-QPSK system by such lightwave circuit have been developed in recent years. For example, in the related art document (Toshikazu Hashimoto, et al., "Polarization Dual Optical Hybrid Modules Using Planar Lightwave Circuit", The Institute of Electronics, Information and Communication Engineers, Electronic Society Conference, collection of conference papers 1 (2009), p. 194), a lightwave circuit structure shown in FIG. 7 is disclosed. On the lightwave circuit of FIG. 7, the above mentioned polarization separation function and the 90-degree optical hybrid function in a planar optical circuit are integrated, and the composition of the planar optical circuit which has the 90-degree optical hybrid function is shown in FIG. 8 as an exemplary diagram.

In the optical circuit hereof, four optical waveguide arms composes an interferometer for TE (Transverse Electric) optical signal and TM (Transverse Magnetic) optical signal. The 90-degree optical hybrid function is realized with an optical path length difference of a specific arm among the four arms longer than the other arms by ¼ of the signal optical wavelength. In the 90-degree optical hybrid interferometer disclosed in the above mentioned non-patent document, an arm 63 and an arm 65 are longer than the other arms by the above mentioned optical path length difference. Thus, when the optical path length difference is given as described, an interfering signal is outputted as shown in FIG. 9 to inputted TE optical signal and TM optical signal as four optical signals each having a phase difference of 702. In FIG. 9, the horizontal axis represents a phase difference between the TE optical signal and the local oscillator light, and InTE and QnTE are outputted together with a phase difference of $\pi/2$, and the same for IpTE and QpTE. Further, InTE and IpTE are outputted together with a phase difference of $\pi$, and the same for QnTE and QpTE. Similarly, InTM and QpTM are outputted together with a phase difference of $\pi/2$, and the same for IpTM and QpTM. In addition, InTM and IpTM are outputted together with a phase difference of $\pi$, and the same for QnTM and QpTM. Further, the arrangement of ports where such output signals are outputted as shown in FIG. 8 follows the specification decided in OIF.

SUMMARY

An exemplary object of the present invention is to provide an optical waveguide device configured with an optical circuit capable of miniaturizing a chip size by reducing crossing parts of optical waveguide arms, and the manufacturing method of such optical waveguide device while realizing an output port arrangement of the OIF standard.

It is a further exemplary object of the invention to provide a 90-degree optical hybrid interferometer of an optical circuit composition reducing the crossing parts of an optical waveguide arms while realizing an output port arrangement of the OIF standard.

An optical waveguide device according to an exemplary aspect of the invention includes optical waveguide circuits, for outputting an optical signal inputted from a first input terminal to which a first waveguide is connected from an ordered arrayed first to a fourth output terminals by having branched into a first to a fourth optical paths, and for outputting an optical signal inputted from a second input terminal with a second waveguide to being connected to from an ordered arrayed first to fourth output terminals by having branched into a fifth to an eighth optical paths, respectively, wherein each the optical waveguide circuit includes an optical circuit for giving a phase difference of $\pi$, $\pi/2$, $3\pi/2$, 0, $\pi$, $\pi/2$, $3\pi/2$ to optical signals which travel along the second to the eighth optical paths respectively to an optical signal which transmits said first optical path, and an optical coupler for multiplexing optical signals which travel along the first to the fifth optical paths, optical signals which travel along the second to the sixth optical paths, optical signals which travel along the third to the seventh optical paths, and optical signals which travel along the fourth to the eighth optical paths respectively, and outputting to the first to the fourth output terminals respectively; and wherein the optical waveguide circuit is arranged in order to have the first to the fourth output terminals of each circuit to be arrayed as mentioned above, and the first and the second waveguides do not cross until an optical signal is inputted to the first and the second input terminals.

And an optical waveguide device manufacturing method according to another exemplary aspect of the invention includes the steps of forming a first clad layer on a substrate, laminating a core layer on the first clad layer, forming a core by patterning said core layer, covering the core with a second clad layer having the same refractive index as the first clad layer, and wherein the patterning of the core layer is performed with a patterning mask which has a core pattern comprising optical waveguide circuits, for outputting an optical signal inputted from a first input terminal with a first waveguide being connected to from an ordered arrayed first to a fourth output terminals by having branched into a first to a fourth optical paths, and for outputting an optical signal inputted from a second input terminal with a second waveguide being connected to from an ordered arrayed first to fourth output terminals by having branched into a fifth to an eighth optical paths, respectively, and wherein the first and the second optical waveguides comprise an optical circuit for giving a phase difference of $\pi$, $\pi/2$, $3\pi/2$, 0, $\pi$, $\pi/2$, $3\pi/2$ to optical signals which are transmitted along the second to the eighth optical paths respectively to an optical signal which travel along the first optical path, an optical coupler for multiplexing optical signals which travel along the first to the fifth optical paths, optical signals which travel along the second to the sixth optical paths, optical signals which travel along the third to the seventh optical paths, and optical signals which travel along the fourth to the eighth optical paths respectively, and outputting to the first to the fourth output terminals respectively; and wherein the optical waveguide circuit is arranged in order to have the first to the fourth output terminals of each circuit to be arrayed as mentioned above, and the first and the second waveguides have a configuration of not to cross until an optical signal is inputted to the first and the second input terminals.

BRIEF DESCRIPTION OF THE DRAWINGS

Exemplary features and advantages of the present invention will become apparent from the following detailed description when taken with the accompanying drawings in which:

FIG. 4A–4E are diagrams showing a comparison of output interference signal characteristics of a 90-degree optical hybrid interferometer, for various configurations of an optical circuit or an optical coupler;

EXEMPLARY EMBODIMENT

Next, a first exemplary embodiment of the present invention will be described with reference to drawings.

The First Embodiment

Figure 1:
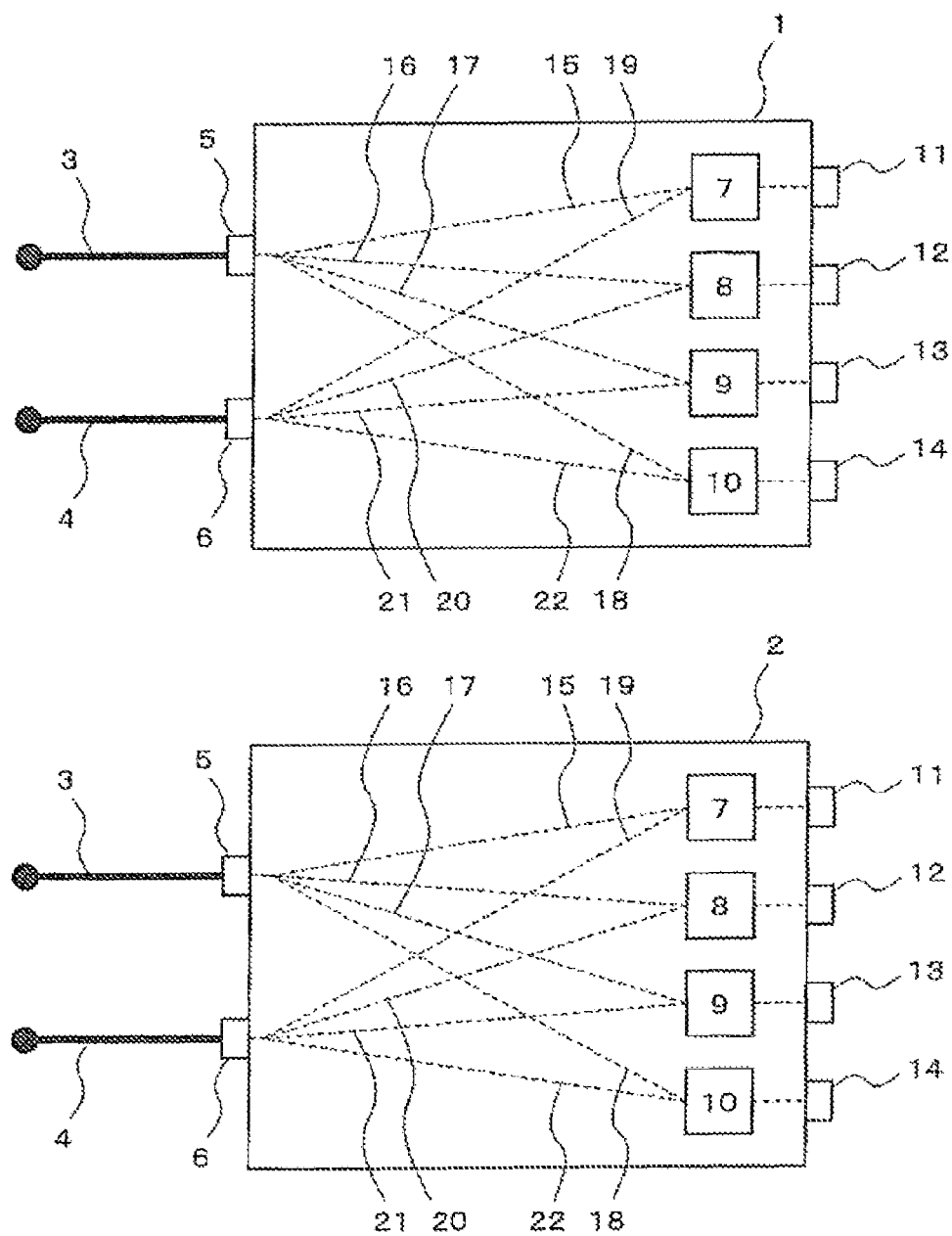
FIG. 1 is an exemplary diagram showing a configuration of a first embodiment of the present invention.

FIG. 1 is an exemplary diagram showing a configuration of an optical waveguide device of a preferred embodiment of the present invention. As shown in FIG. 1, the optical waveguide device is equipped with optical waveguide circuits 1 and 2. Each of the optical waveguide circuits 1 and 2 has an input terminal 5 with a waveguide 3 being connected to, and branches an optical signal inputted from the input terminal 5 to optical paths 15-18 and outputs from an ordered arrayed output terminals 11-14. Further, each of the optical waveguide circuits 1 and 2 has an input terminal 6 with a waveguide 4 being connected to, and branches an optical signal inputted from the input terminal 6 to optical paths 19-22, and outputs from an ordered arrayed output terminals 11-14.

The optical waveguide circuits 1 and 2 have an optical circuit which gives a phase difference of $\pi$, $\pi/2$, $3\pi/2$, 0, $\pi$, $\pi/2$, $3\pi/2$ to optical signals which travels along the optical paths 16-22 respectively, from an optical signal which travels along the optical path 15. Further, the optical waveguide circuits 1 and 2 have optical couplers 7-10 which multiplex optical signals which travel along the optical paths 15 and 19, optical signals which transmit the optical paths 16 and 20, optical signals which travel along the optical paths 17 and 21, and optical signals which travel along the optical paths 18 and 22 respectively, and output to output terminals 11-14 respectively.

The optical waveguide circuits 1 and 2 are arranged so that the output terminals 11-14 of each circuit are arrayed as mentioned above, and the structure of waveguides 3 and 4 are made not to cross until an optical signal is inputted to the input terminals 5 and 6.

By the above mentioned configuration, a phase difference of +$\pi$, +$\pi/2$, +$3\pi/2$ is given to optical signals outputted from output parts 12, 13, and 14 respectively, to an optical signal which is outputted in an output part 11 in each of the optical waveguide circuits 1 and 2. The arrangement relation of such output signals of the output parts 11-14 corresponds to the output port arrangement of a 90-degree optical hybrid interferometer of the OIF standard. As a result, by the aforementioned configuration, an optical waveguide device which realizes a 90-degree optical hybrid interferometer of an optical circuit composition capable of compacting a chip size by reducing the crossing parts of optical waveguide arms can be composed while realizing the output port arrangement the OIF standard.

The Second Embodiment

Figure 2:
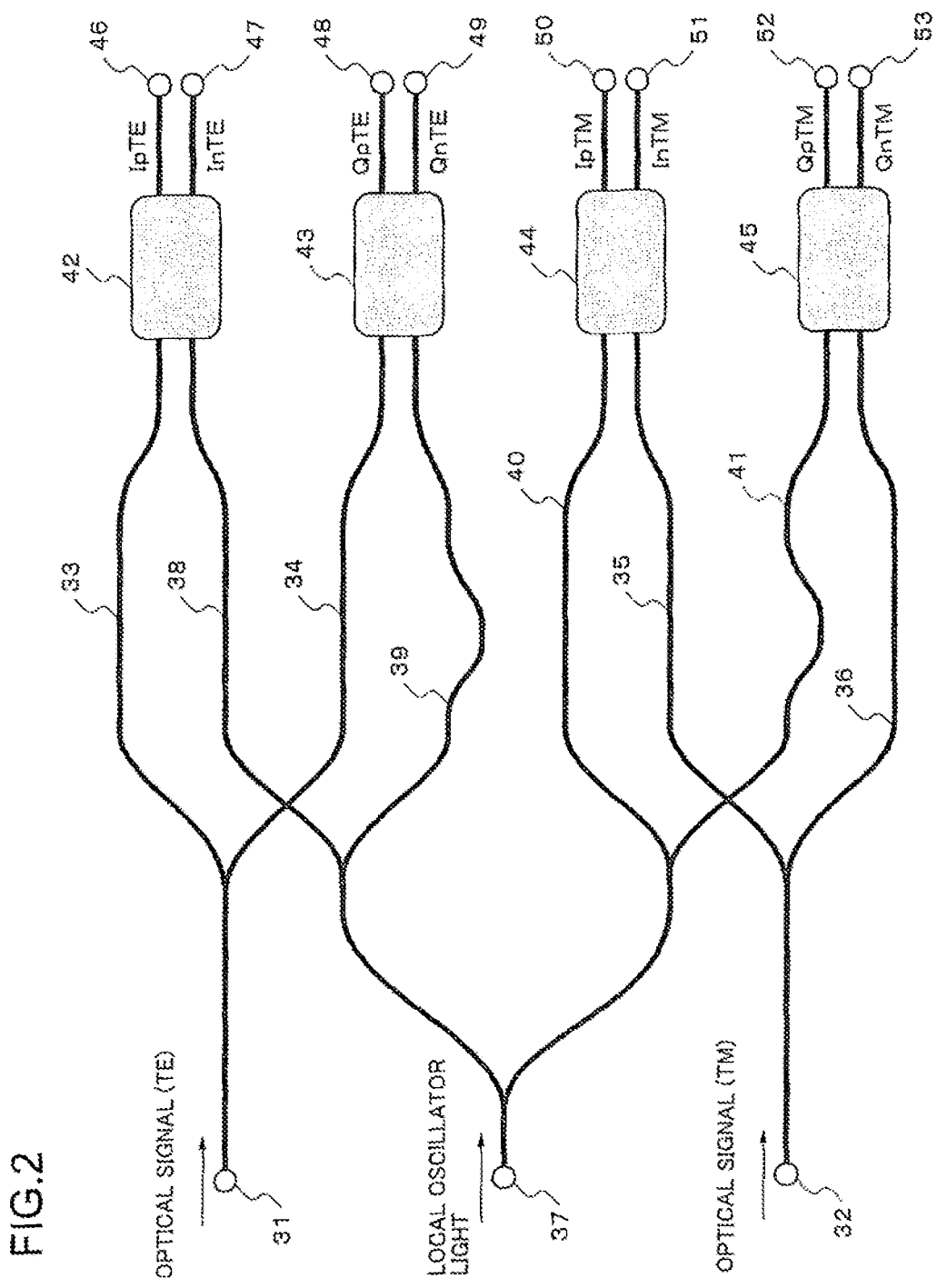
FIG. 2 is an exemplary diagram showing a configuration of a second embodiment of the present invention.

FIG. 2 is an exemplary diagram showing an optical waveguide composition of a 90-degree optical hybrid interferometer of the second embodiment of the present invention. In FIG. 2, signal optical input ports 31 and 32 receive TE and TM optical signals having polarized wave separation respectively. Signal optical waveguide arms 33-36 transmit TE and TM optical signals each of which is branched in two. A local oscillator light input port 37 receives local oscillator light, and is arranged between the signal optical input ports 31 and 32. Local oscillator optical waveguide arms 38-41 transmit local oscillator light which is branched into two in the TE optical signal side and the TM optical signal side and further branched in two respectively. Optical coupler 42 combines each pair of the signal optical waveguide arms 33 and the local oscillator optical waveguide arms 38, and outputs each pair of interference light. Optical coupler 43 combines each pair of the signal optical waveguide arms 34 and the local oscillator optical waveguide arms 39 respectively, and outputs each pair of interference light. Optical coupler 44 combines each pair of the signal optical waveguide arms 35 and the local oscillator optical waveguide arms 40 respectively, and outputs each pair of interference light. Optical coupler 45 combines each pair of the signal optical waveguide arms 36 and the local oscillator optical waveguide arms 41 respectively, and outputs each pair of interference light.

In addition, optical couplers 42-45 have both the function to branch a lightwave which is transmitted through waveguide arms 33-36 and 38-41 into 2 lightwaves and give predetermined phase information, and the optical multiplex function of the optical couplers 7 and 8 in the first embodiment.

Output ports 46-53 retrieve the interference signal by a phase difference of the signal light and the local oscillator light outputted by each optical couplers, as phase information of four values, Ip, In, Qp, and Qn, on the I-Q plane. The interference signals outputted by the output ports 46-53 are arranged in the order of IpTE, InTE, QpTE, QnTE, IpTM, InTM QpTM, and QnTM.

At each of the TE optical signal side and the TM optical signal side, a pair of optical signal waveguide arm and local oscillator waveguide arm at either the I phase side and the Q phase side is structured as having an optical path length difference. That is, the optical path length difference is set to either one of 33 and 38 or 34 and 39 at the I phase side and to either one of 35 and 40 or 36 and 41 at the Q phase side. The optical path length difference hereof is given with one arm in the pair being lengthened by the optical path length difference. Consequently, for the lightwave which transmits in said arm longer by the optical path length difference, a phase delay occurs when inputting to each optical coupler, compared with the lightwave transmitted through the other arm. As a result, for the interference signal outputted from each optical coupler, at the TE optical signal side, both the combination of IpTE and QpTE, and the combination of InTE and QnTE are in the relation of having a phase difference corresponding to the optical path length difference mentioned above. Similarly, at the TM optical signal side, both the combination of IpTM and QpTM, and the combination of InTM and QnTM also have the phase difference corresponding to the optical path length difference mentioned above.

On the other hand, optical couplers have different output interference characteristics according to the structure thereof, and even by the optical signal inputted from the same phase, a phase difference occurs in the outputted interference signal by the difference among each output interference characteristic of each optical coupler. Here, the phase difference which occurs by the difference of output interference characteristic of the optical couplers 42 and 43, the phase difference of QpTE to IpTE which occurs in sum of a phase difference corresponding to the optical path length difference mentioned above, and the phase difference of QnTE to InTE, are all set to be +π/2. Similarly, the phase difference which occurs by the difference of output interference characteristic of the optical couplers 44 and 45, the phase difference of QpTM to IpTM which occurs in sum of a phase difference corresponding to the optical path length difference mentioned above, and the phase difference of QnTM to InTM, are all set to be +π/2.

In FIG. 2, an optical path length difference corresponding to the phase difference of π/2 of transmitted local oscillator light is set between the local oscillator waveguide arms 38 and 39. That is, the arm 39 is longer than the arm 38 by ¼ of the wavelength of the local oscillator light which is transmitted thorough an optical waveguide. Similarly, an optical path length difference corresponding to the phase difference of π/2 of transmitted local oscillator light is also set between the local oscillator waveguide arms 40 and 41. That is, the arm 41 is longer than the arm 40 by ¼ of the wavelength of the local oscillator light which is transmitted through an optical waveguide. As a result, a phase difference of π/2 occurs between optical signals branched to the I phase side and the Q phase side. Further, the optical couplers 42-45 have the same output interference characteristics. Therefore, a phase difference among the output interference characteristics of each optical coupler is zero.

With an optical waveguide circuit configuration as mentioned above, both InTE and QnTE, and IpTE and QpTE are outputted with a phase difference of π/2. Further, both InTE and IpTE, and QnTE and QpTE are outputted with a phase difference of π. Similarly, both InTM and QnTM, and IpTM and QpTM are outputted with a phase difference of π/2. Further, both InTM and IpTM, and QnTM and QpTM are outputted with a phase difference of π. Thus, the relation of the output interference signal characteristics from the output ports 46-53 is the same as the output port arrangement of the OIF standard.

As described above, by this embodiment, it is possible to realize an output port arrangement as the OIF standard by an optical circuit layout reducing the crossing parts of optical waveguide arms.

The Third Embodiment

Figure 3:
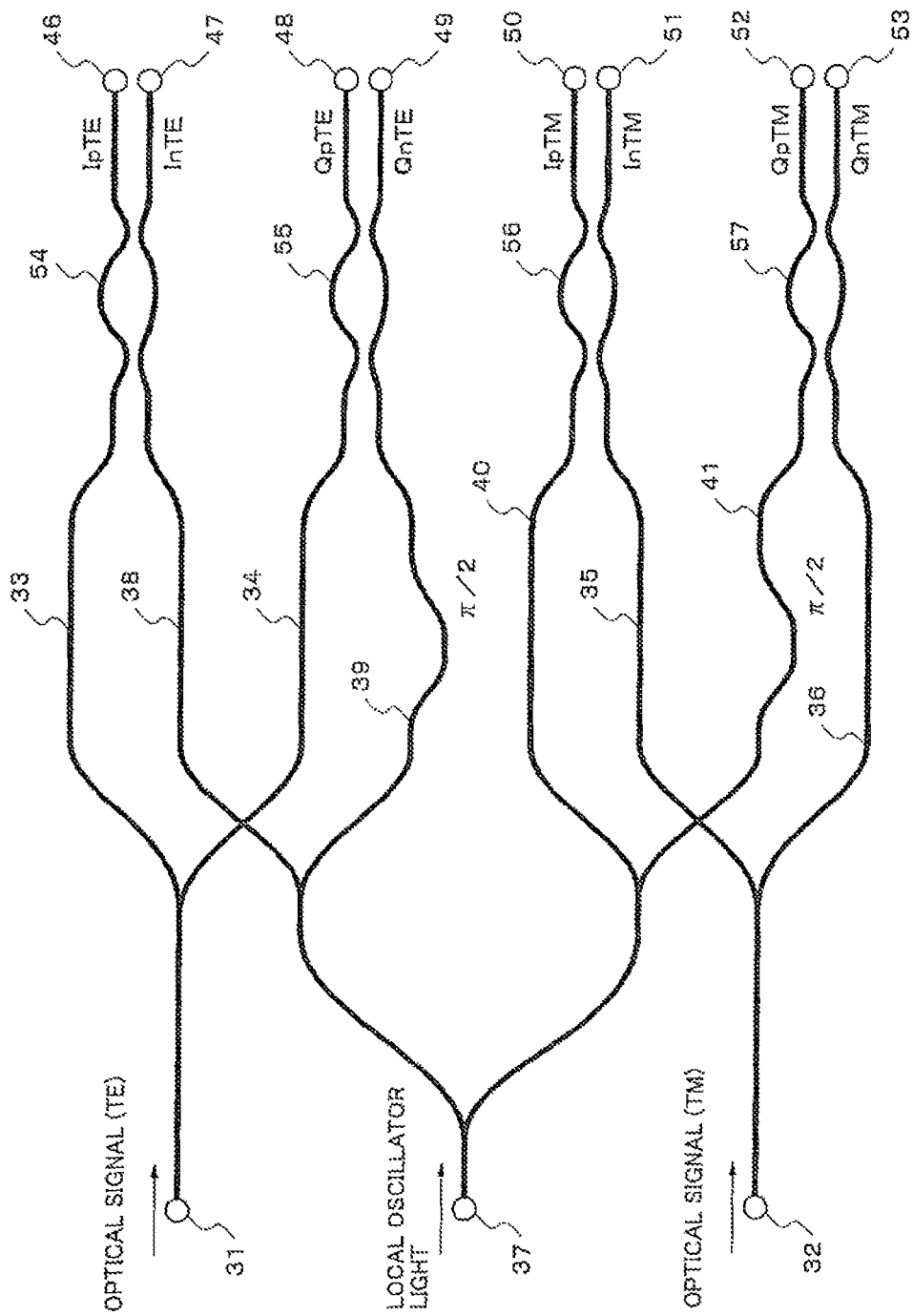
FIG. 3 is an exemplary diagram showing a configuration of a third embodiment of the present invention.

FIG. 3 is an exemplary diagram showing an optical waveguide composition of a 90-degree optical hybrid interferometer of the third embodiment of the present invention. In FIG. 3, the same code is marked to the part corresponding to FIG. 2.

In the third embodiment, Mach-Zehnder interferometers 54-57 are all used as an optical coupler. Further, the local oscillator optical waveguide arms giving a phase difference of π/2 to local oscillator light are an arm 39 and an arm 41, and all the upper optical waveguides of Mach-Zehnder interferometers 54-57 are longer than the lower ones. As a result, the output interference characteristics itself of each Mach-Zehnder interferometer are all equal, and the phase difference according to discrepancy of phase conversion characteristics are zero. Further, the length of each part (from the branching part to an optical coupler) composing the interferometer in signal optical waveguides 33, 34, 35 and 36 are equal. As described above, by composing an optical circuit of a 90-degree hybrid interferometer, the output ports 46-53 of the output interference signal can be made as an output port arrangement following the OIF standard. Further, because the optical waveguide branches of the same side of the Mach-Zehnder interferometers 54-57 functioning as an optical coupler are longer than those of the other side, even if the optical coupling strength deviates from the designed value caused by processing inaccuracy, influence on the phase difference according to discrepancy of phase conversion characteristics can be suppressed. This is because when processing, if the deviation mentioned above has been formed by an identical factor and if the deviation is at least in the same device, it is assumed to occur to the same direction by the same amount, and the deviation of the phase difference of output interference characteristics is canceled relatively.

An optical waveguide circuit of the above mentioned configuration can be produced by the same fine processing technology as the semiconductor integrated circuit manufacturing process. By patterning a silicon oxide film laminated on the silicon substrate which has a different refractive index, for example, as a waveguide core or a clad using a photolithography approach, an optical waveguide with the predetermined shape can be formed. In the optical waveguide circuit of the composition of FIG. 3, as the length to the part which connects with an optical coupler from a branching part, the length of the optical waveguide arms 33, 34, 35, 36, 38, and 40 are made 3 mm, for example. When the center wavelength of an optical, signal λ is 1.55 μm for example, the optical waveguide arms 39 and 41 are longer than the other optical waveguide arms by 0.265 μm which corresponds to λ/4n. Here, n is equivalent refractive index of an optical waveguide. Further, the width and the optical path length difference of the Mach-Zehnder interferometers 24-27 are set to 780 μm and 0.265 μm, for example, respectively.

Further, even if all optical waveguide parts on the lower side in the figure of the Mach-Zehnder interferometers 54-57 in FIG. 3 are longer contrary to the shape of FIG. 3, the output interference characteristic itself of each Mach-Zehnder interferometer remains unchanged. Therefore, the same suitable effect as in the case mentioned above can be obtained.

In addition, in the optical waveguide configuration mentioned above, with symmetrical optical couplers, such as directional couplers and multi-mode interferometers, as an optical coupler, the output port arrangement as the OIF standard can also be realized. However, although relative phase difference relations of each output interference signal characteristic of such 90-degree optical hybrid interferometer is fixed, the whole phase itself will differ by the configuration of an optical circuit or an optical coupler.

FIG. 4A thorough FIG. 4E show a comparison of a phase pattern of output interference signal characteristics from the output port of a 90-degree optical hybrid interferometer in which the composition of the optical circuit or the optical coupler is different. In the figures, the horizontal axis Δϕ is the phase difference of the signal light and the local oscillator light when inputted to the Mach-Zehnder interferometer, and the vertical axis is the output intensity (a.u.). Further, the figures show only Ip and Qp signals for convenience of comparison, and indications on In and Qn signals which have the characteristic of reversed Ip and Qp signals respectively are omitted.

In case of a configuration shown in FIG. 3, the output interference characteristic will be as FIG. 4A, and the phase itself of the output intensity becomes identical at the TE side and the TM side. Further, when the shapes of the Mach-Zehnder interferometers 24-27 in FIG. 3 are reversed, and all lower side optical waveguide parts in the figure are lengthened, the output interference characteristic will be as FIG. 4B, and the phase itself of the output intensity is also identical at the TE side and the TM side.

On the other hand, when the Mach-Zehnder interferometers 54-57 in FIG. 3 are replaced by symmetrical optical coupler such as directional coupler or multi-mode interferometer, the output interference characteristics will be as FIG. 4C, and the phase of the output intensity between the TE side and the TM side no longer matches.

As described above, in the third embodiment, the crossing parts of optical waveguide arms can be reduced while realizing the output port arrangement of the OIF standard as in the first and the second embodiment. Further, by using a Mach-Zehnder interferometer as an optical coupler and by having a composition of all waveguide parts on the same side being longer, the variations on optical coupling strength can be suppressed. Furthermore, it is suitable in particular when wanting to make the phase itself of the output interference characteristic identical at the TE side and the TM side.

The Fourth Embodiment

Figure 5:
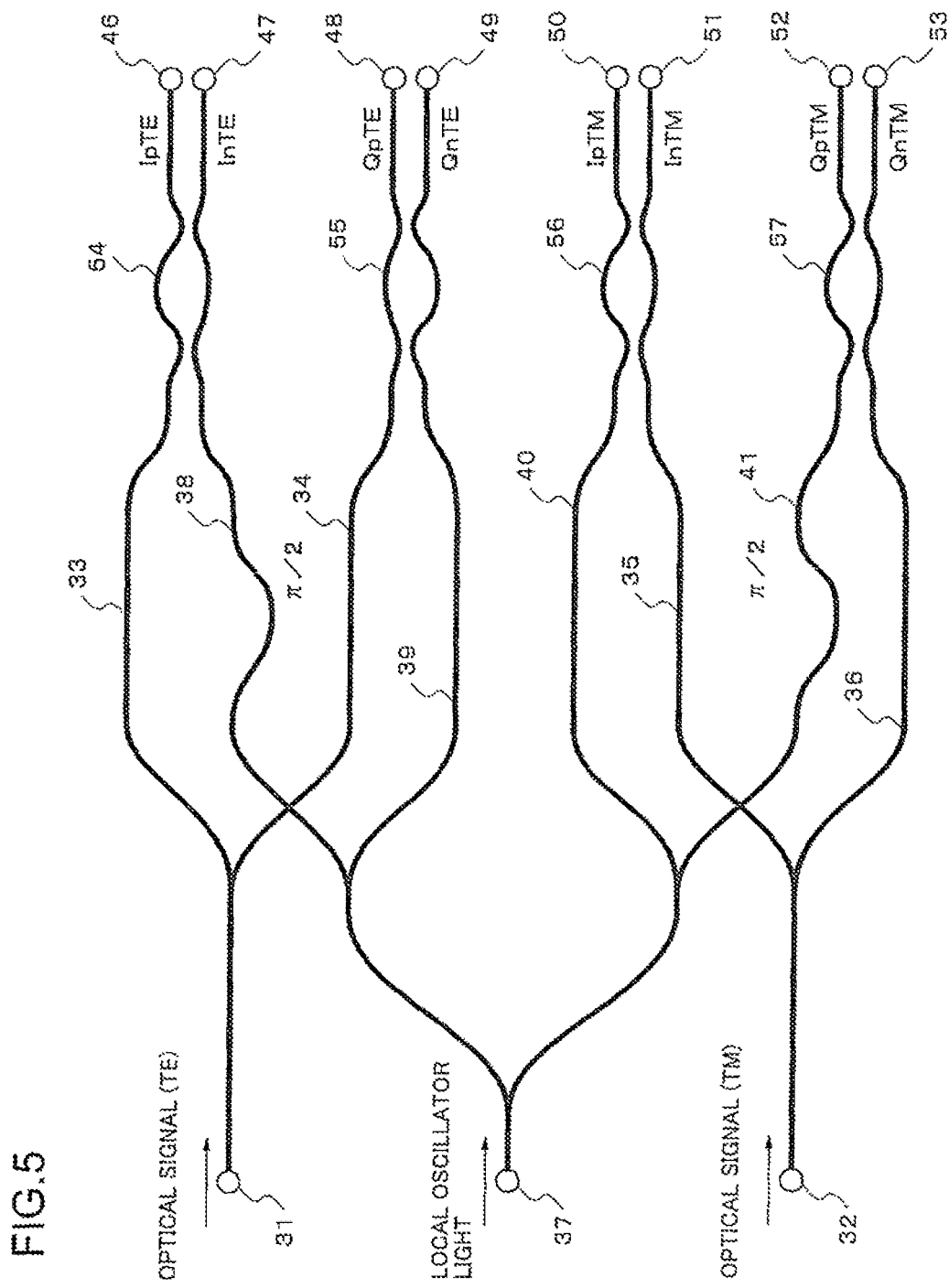
FIG. 5 is an exemplary diagram showing a configuration of a fourth embodiment of the present invention.

FIG. 5 is an exemplary diagram showing an optical waveguide composition of a 90-degree optical hybrid interferometer of the fourth embodiment of the present invention. Whereas a basic configuration is the same as the configuration of the third embodiment, a local oscillator waveguide arms adding an optical path length which gives a phase difference of π/2 to a local oscillator light are an arm 38 and an arm 41 in the fourth embodiment. Further, Mach-Zehnder interferometers 54-57 are used as an optical coupler. Among the interferometers, only for the Mach-Zehnder interferometer 55, lower optical waveguide in the figure is longer, and for all others, upper ones in the figure are longer. As a result, the output phase characteristic of Mach-Zehnder interferometer 55 as an optical coupler is in the state that is reversed to other Mach-Zehnder interferometers, in other words, in the state having the phase difference of π. Accordingly, as a phase difference produced by the difference of phase conversion characteristics of the Mach-Zehnder interferometers, the value is set to be zero for the Mach-Zehnder interferometers 54, 56, and 57, and the value is set to be π for the Mach-Zehnder interferometer 55. Further, the values hereof and the phase difference among each output interference signal which is generated in sum of the phase difference corresponding to a phase delay of the arm, will be +π/2 for IpTE and QpTE, InTE and QnTE, IpTM and QpTM, and InTM and QnTM.

With an optical circuit of a 90-degree optical hybrid interferometer as described above, the output interference characteristics can be made as the output port arrangement of the OIF standard. Further, in the optical circuit configuration mentioned above being adopted, the position which the wavelength of local oscillator optical waveguide arm and the signal light arm crosses is symmetrical at the TE side and the TM side. For this reason, when there is a need of a design parameter correction such as changes in the optical path length by the cross part of arms, the same correction should be performed in both, and time in analysis and design can be saved substantially.

The effect mentioned above can be obtained similarly even when the Mach-Zehnder interferometers 54-57 in FIG. 5 are changed for one with a shape that reversed all sides that make each optical waveguide longer.

In addition, in case on a configuration shown in FIG. 5, the output interference characteristic from the output port of a 90-degree optical hybrid interferometer will be as (d) in FIG. 4.

As described above, in the fourth embodiment, the crossing parts of optical waveguide arms can be reduced while realizing the output port arrangement of the OIF standard as in the first, second, and third embodiments. Further, because the local oscillator optical waveguide structure is symmetrical at the TE side and the TM side, when there is a need of a design parameter correction, time in analysis and design can be saved substantially.

The Fifth Embodiment

Figure 6:
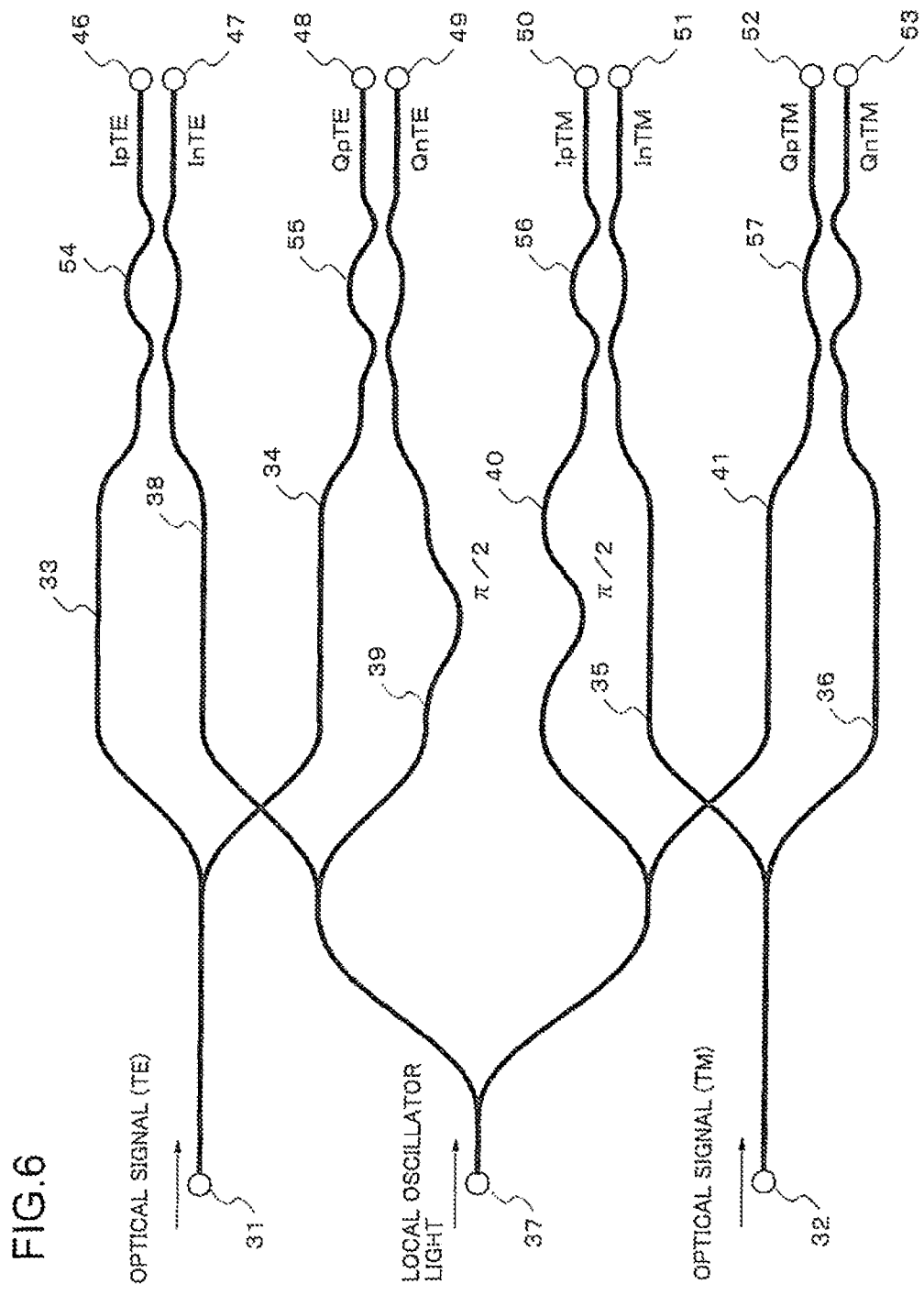
FIG. 6 is an exemplary diagram showing a configuration of a fifth embodiment of the present invention.

FIG. 6 is an exemplary diagram showing an optical waveguide composition of a 90-degree optical hybrid interferometer of the fifth embodiment of the present invention. The fifth embodiment is a modification of the fourth embodiment and a local oscillator waveguide arms adding an optical path length which gives a phase difference of π/2 to a local oscillator light are an arm 39 and an arm 40. Further, Mach-Zehnder interferometers 54-57 are used as an optical coupler, and among the interferometers only for the Mach-Zehnder interferometer 57, lower optical waveguide in the figure is longer, and for all others, upper ones in the figure are longer. As described above, by composing an optical circuit of a 90-degree optical hybrid interferometer, the output interference characteristics can be made as the output port arrangement of the OIF standard. Further, in the optical circuit configuration mentioned above, as in the fourth embodiment, the position which the wavelength of local oscillator optical waveguide arm and the signal light arm crosses is symmetrical at the TE side and the TM side. For this reason, when there is a need of a design parameter correction such as changes in the optical path length by the cross part of arms, the same correction should be performed in both, and time in analysis and design can be saved substantially.

The effect mentioned above can be obtained similarly even when the Mach-Zehnder interferometers 54-57 in FIG. 5 are changed for one with a shape that reversed all sides that make each optical waveguide longer.

In addition, in case on a configuration shown in FIG. 6, the output interference characteristic from the output port of a 90-degree optical hybrid interferometer will be as FIG. 4E.

As described above, in the fifth embodiment, the crossing parts of optical waveguide arms can be reduced while realizing the output port arrangement of the OIF standard as in the first, second, third, and fourth embodiments. Further, because the local oscillator optical waveguide structure is symmetrical at the TE side and the TM side, when there is a need of a design parameter correction, time in analysis and design can be saved substantially.

The Sixth Embodiment

A 90-degree optical hybrid interferometer of the sixth embodiment of the present invention retrieves a phase information of four values on I-Q plane, a phase information Ip and In having a phase difference of $\pi$, and a phase information of Qp and Qn having a phase difference of $\pi/2$ to Ip and In respectively, from optical signals TE (Transverse Electric) and TM (Transverse Magnetic) which are separated polarized waves. The 90-degree optical interferometer of the sixth embodiment further has two signal light input ports which inputs the TE optical signal and the TM optical signal which are separated polarized waves, a local oscillator light input port arranged between the two signal light input ports which inputs a local oscillator light, a signal waveguide arm which transmits said TE optical signal and the TM optical signal which are branched in two to the I phase side and the Q phase side respectively after inputted from the signal light input port, a local oscillator waveguide arm which transmits the local oscillator light after being branched into two in said TE optical signal side and TM optical signal side and further branched in two respectively after being inputted from the local oscillator light input port, four optical couplers at said TE optical signal side which combines each pair of the TE optical signal and said local oscillator light branched into two at the I phase side and the Q phase side respectively, two optical couplers at the TM optical signal side which combines each pair of the TM optical signal and the local oscillator light having branched into two at the I phase side and the Q phase side respectively, and four output port which retrieves the four interference signals by a phase difference of a pair of the optical signal and the local oscillator light outputted by the two optical couplers at each of the TE optical signal side and TM optical signal side as the phase information Ip, In, Qp, and Qn. The 90-degree optical hybrid interferometer of the sixth embodiment is characterized by having an optical path length difference to a pair of the signal optical waveguide arm and the local oscillator optical waveguide arm at either the I phase side or the Q phase side at the TE optical signal side and the TM optical signal side respectively thus giving a phase delay corresponding to the optical path length to output interference signals Ip and Qp of the I phase side and the Q phase side and between In and Qn respectively. The 90-degree optical hybrid interferometer of the sixth embodiment is further characterized by having the output signal of the eight output ports arranged in order of Ip, In, Qp, and Qn at the TE optical signal side and arranged in order of Ip, In, Qp, and Qn at the TM optical signal side at each of the TE optical signal side and the TM optical signal side by having the phase difference among the output interference characteristics of each optical coupler at the I phase side and the Q phase side, the phase delay, and the output phase difference of both Qp to output interference signal Ip and Qn to output interference signal In which occurs in sum of the phase difference and the phase delay mentioned above, as $+\pi/2$.

The Seventh Embodiment

A manufacturing method of a 90-degree optical hybrid interferometer of the seventh embodiment of the present invention is to retrieve a phase information of four values on I-Q plane, a phase information Ip and In having a phase difference of $\pi$, and a phase information of Qp and Qn having a phase difference of $\pi/2$ to Ip and In respectively, from an optical signals TE (Transverse Electric) and TM (Transverse Magnetic) which are separated polarized waves. The 90-degree optical hybrid interferometer of the seventh embodiment composes two signal light input ports which inputs the TE optical signal and TM optical signal which are separated polarized waves, a local oscillator light input port arranged between the two signal light input ports which inputs a local oscillator light, a signal waveguide arm which transmits the TE optical signal and TM optical signal which are branched in two to the I phase side and the Q phase side respectively after being inputted from the signal light input port, a local oscillator waveguide arm which transmits the local oscillator light after branched into two in the TE optical signal side and TM optical signal side and further branched in two respectively after inputted from the local oscillator light input port, four optical couplers at the TE optical signal side which combines each pair of the TE optical signal and said local oscillator light branched into two at the I phase side and the Q phase side respectively, two optical couplers at the TM optical signal side which combines each pair of the TM optical signal and the local oscillator light branched into two at the I phase side and the Q phase side respectively, and four output port which retrieves the four interference signals by a phase difference of a pair of the signal light and the local oscillator light outputted by the two optical couplers at each of the TE to optical signal side and TM optical signal side as the phase information Ip, In, Qp, and Qn.

The 90-degree optical hybrid interferometer of the seventh embodiment is characterized by having an optical path length difference to a pair of the signal optical waveguide arm and the local oscillator optical waveguide arm at either the I phase side or the Q phase side at the TE optical signal side and the TM optical signal side respectively thus giving a phase delay corresponding to the optical path length difference to output interference signals Ip and Qp of the I phase side and the Q phase side.

The 90-degree optical hybrid interferometer of the seventh embodiment is further characterized by having the output signal of the eight output ports arranged in order of Ip, In, Qp, and Qn at the TE optical signal side and arranged in order of Ip, In, Qp, and Qn at the TM optical signal side at each of the TE optical signal side and the TM optical signal side by setting the output phase difference which is the sum of the phase difference among the output interference characteristics of each optical coupler at the I phase side and the Q phase side and the phase delay, as +π/2.

(Supplement 1)

An optical waveguide device comprising:

an optical waveguide circuit, for outputting an optical signal which is inputted from a first input terminal to which a first waveguide is connected, and is branched into a first to a fourth optical paths, from ordered arrayed from a first to a fourth output terminals, and for outputting an optical signal which is inputted from a second input terminal to which a second waveguide is connected, and is branched into a fifth to an eighth optical paths, from ordered arrayed from a first to fourth output terminals, wherein said optical waveguide circuit comprises:

an optical circuit for giving a phase difference of π, π/2, 3π/2, 0, π, π/2, 3π/2 to optical signals which travel along said second to said eighth optical paths respectively to an optical signal which transmits said first optical path; and an optical coupler for multiplexing optical signals which travel along said first to said fifth optical paths, optical signals which travel along said second to said sixth optical paths, optical signals which travel along said third to said seventh optical paths, and optical signals which travel along said fourth to said eighth optical paths respectively, and outputting to said first to said fourth output terminals respectively; and wherein said optical waveguide circuit is arranged in order to have said first to said fourth output terminals of each circuit to be arrayed as mentioned above; and said first and said second waveguides do not cross until an optical signal is inputted to said first and said second input terminals.

(Supplement 2)

The optical waveguide device according to supplement 1, wherein said optical waveguide circuit comprises:

a first and a second optical waveguide arms for transmitting said branched first optical signal respectively;

a third and a fourth optical waveguide arms for transmitting said branched second optical signal respectively;

a first optical coupler for outputting a first and a second interference signals having a phase difference of π respectively by combining a pair of optical signal which transmits said first and said third optical waveguide arms; and a second optical coupler for outputting a third and a fourth interference signals having a phase difference of π respectively by combining a pair of optical signal which transmits said second and said fourth optical waveguide arms; wherein said first to said fourth interference signals are outputted from said first to said fourth output parts respectively;

an optical path difference is set to either pair of said first and said second optical waveguide arms or pair of said third and said fourth optical waveguide arms; and a value of said optical path length difference and a value of phase difference according to phase conversion characteristics which each said first and said second optical couplers have are set to said first and said third interference signals in order to have said second and said fourth interference signals to have a phase difference of +π/2 respectively.

(Supplement 3).

The optical waveguide device according to supplement 1 or supplement 2, wherein

TE (Transverse Electric) and TM (Transverse Magnetic) signals which are separated polarized waves are inputted respectively as said first optical signal at said first interferometer and as second optical signal at said second interferometer; and one and the other of the branched optical signals are inputted as said second signal light at said first interferometer and said first optical signal at said second interferometer, respectively.

(Supplement 4).

The optical waveguide device according to any one of supplement 1 to supplement 3, wherein an optical path length difference is set to a pair of said third and said fourth optical waveguide arms.

(Supplement 5).

The optical waveguide device according to supplement 4, wherein said first and said second optical couplers are each configured with a Mach-Zehnder interferometer.

(Supplement 6)

An optical waveguide device manufacturing method comprising the steps of:

forming a first clad layer on a substrate;

laminating a core layer on said first clad layer;

forming a core by patterning said core layer;

covering said core with a second clad layer having the same refractive index as said first clad layer; and wherein:

said patterning of said core layer is performed with a patterning mask and compose a core pattern of:

optical waveguide circuits, for outputting an optical signal inputted from a first input terminal with a first waveguide being connected to from an ordered arrayed first to a fourth output terminals by having branched into a first to a fourth optical paths, and for outputting an optical signal inputted from a second input terminal with a second waveguide being connected to from an ordered arrayed first to fourth output terminals by having branched into a fifth to an eighth optical paths, respectively; wherein said first and said second optical waveguides comprise:

an optical circuit for giving a phase difference of π, π/2, 3π/2, 0, π, π/2, 3π/2 to optical signals which are transmitted along said second to said eighth optical paths respectively to an optical signal which travel along said first optical path;

an optical coupler for multiplexing optical signals which travel along said first to said fifth optical paths, optical signals which travel along said second to said sixth optical paths, optical signals which travel along said third to said seventh optical paths, and optical signals which travel along said fourth to said eighth optical paths respectively, and outputting to said first to said fourth output terminals respectively; and wherein said optical waveguide circuit is arranged in order to have said first to said fourth output terminals of each circuit to be arrayed as mentioned above; and said first and said second waveguides have a configuration of not to cross until an optical signal is inputted to said first and said second input terminals.

(Supplement 7).

The optical waveguide device manufacturing method according to supplement 6, wherein said optical waveguide circuit comprises:

a first and a second optical waveguide arms for transmitting said branched first optical signal respectively;

a third and a fourth optical waveguide arms for transmitting said branched second optical signal respectively;

a first optical coupler for outputting a first and a second interference signals having a phase difference of π respectively by combining a pair of optical signal which transmits said first and said third optical waveguide arms; and a second optical coupler for outputting a third and a fourth interference signals having a phase difference of π respectively by combining a pair of optical signal which transmits said second and said fourth optical waveguide arms; wherein said first to said fourth interference signals are configured to output from said first to said fourth output parts respectively;

an optical path difference is set to either pair of said first and said second optical waveguide arms or pair of said third and said fourth optical waveguide arms; and a value of said optical path length difference and a value of phase difference according to phase conversion characteristics which each said first and said second optical couplers have are set to said first and said third interference signals in order to have said second and said fourth interference signals to have a phase difference of +π/2 respectively.

(Supplement 8)

The optical waveguide device manufacturing method according to supplement 6 or supplement 7, wherein said patterning of said core layer composes a core pattern of:

said first optical signal at said first interferometer and said second optical signal at said second interferometer are inputted respectively; and one and the other of the branched optical signals which is branched into two are inputted as said second signal light at said first interferometer and said first optical signal at said second interferometer, respectively.

(Supplement 9)

The optical waveguide device manufacturing method according to Supplement 7 or supplement 8, wherein an optical path length difference is set to a pair of said third and said fourth optical waveguide arms.

(Supplement 10)

The optical waveguide device manufacturing method according to any one of supplement 7 to supplement 9, wherein said first and said second optical couplers are each configured with a Mach-Zehnder interferometer.

Figure 7:
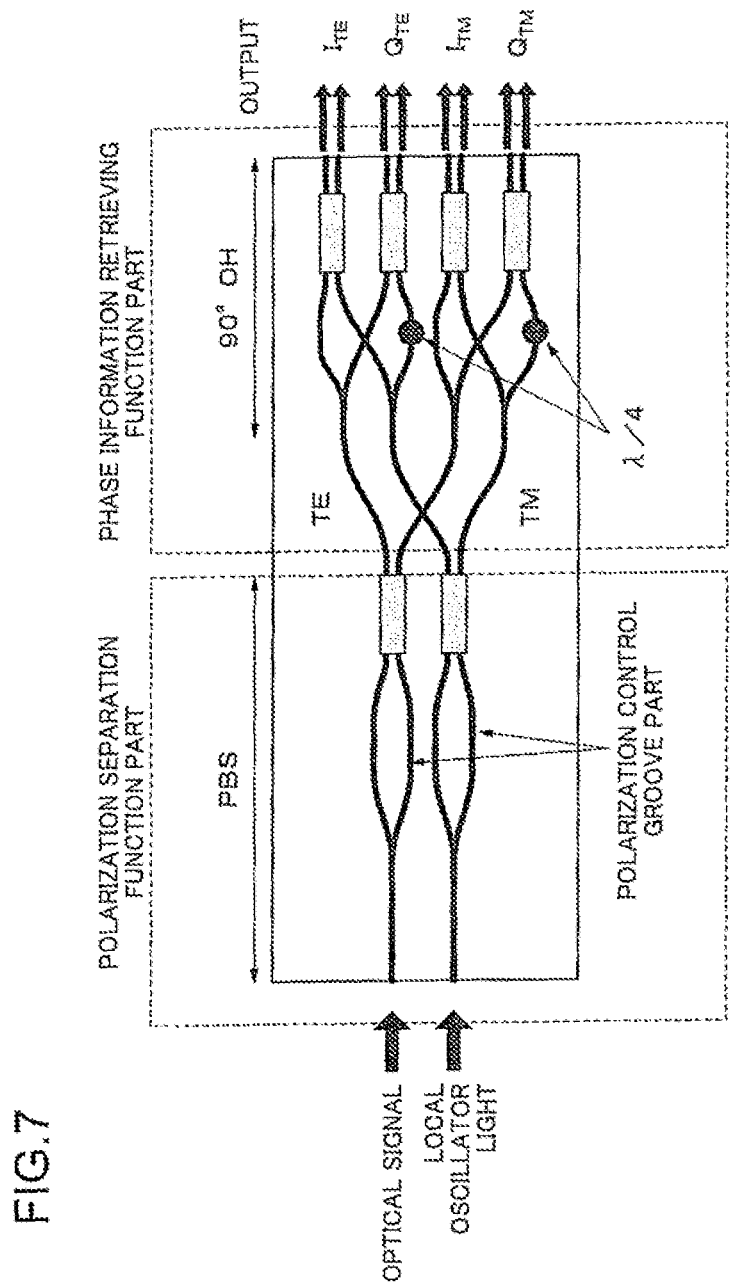
FIG. 7 is an exemplary diagram showing a configuration example of a receiver of a general DP-QPSK system including a function to perform polarized wave separation of optical signals and a 90-degree optical hybrid function for retrieving phase information from the optical signals which are separate polarized-waves.
Figure 8:
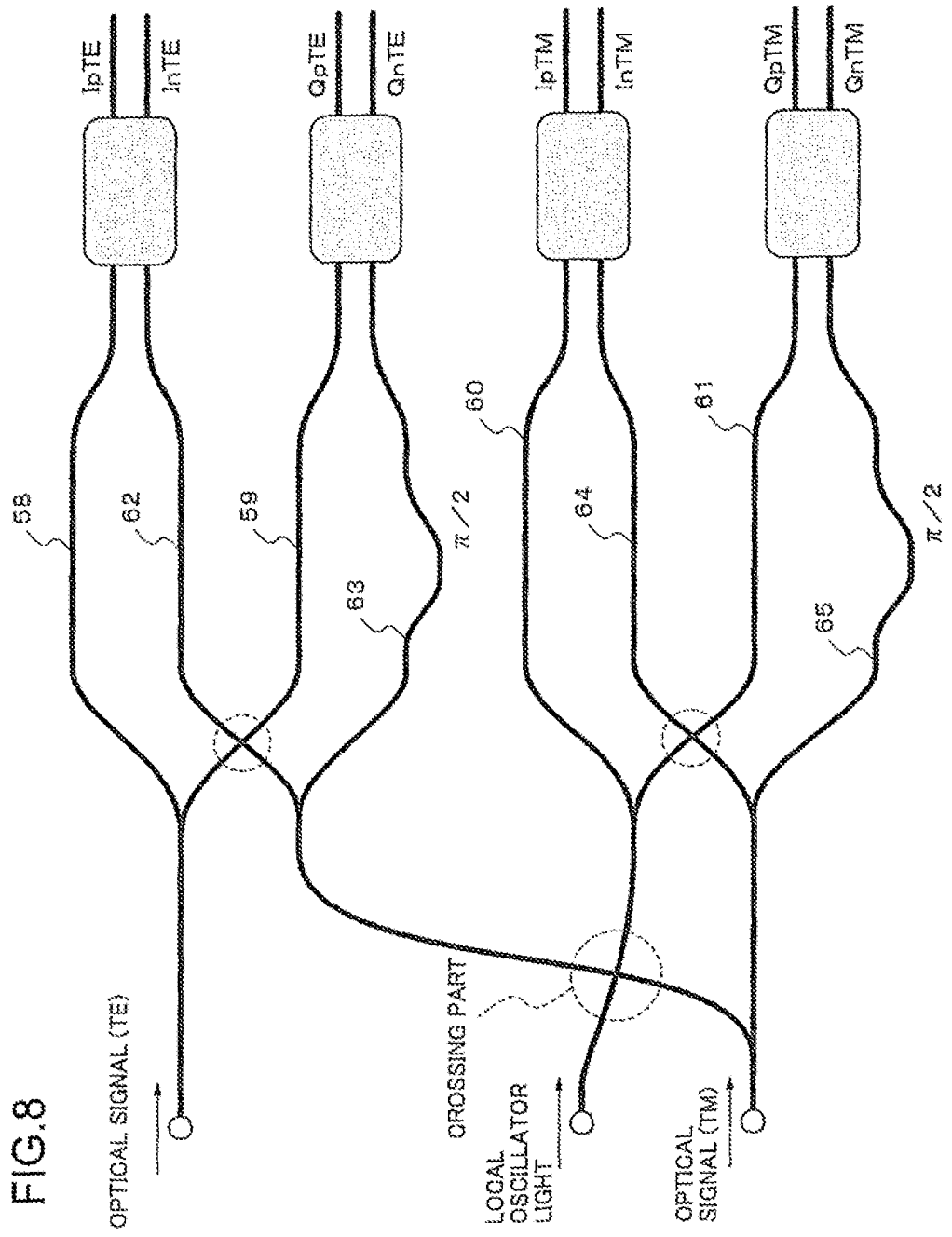
FIG. 8 is an exemplary diagram showing an example of a configuration of a 90-degree optical hybrid interferometer used for a receiver of a general DP-QPSK system.
Figure 9:
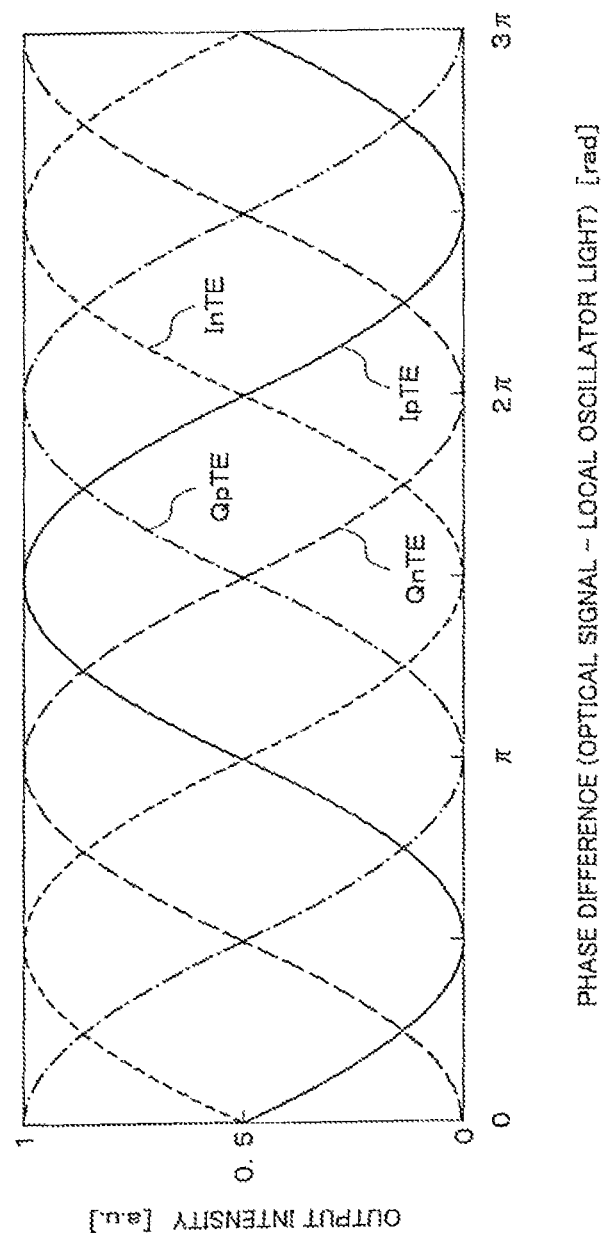
FIG. 9 is a diagram showing output interference signal characteristics of the TE signal side of a general 90-degree optical hybrid interferometer.

When the output port is arranged following the OIF standard as mentioned above, the optical circuit configuration as in FIG. 7, either optical waveguide which transmits a local oscillator light branched into two has a point intersecting with an optical waveguide which transmits a signal light. At this cross part, in order to prevent an occurrence of an excessive loss as well to prevent a crosstalk, in other words to have a light combine at the waveguide side which is not supposed to perform a waveguide, there is a need to design the crossing angle close as possible to a right angle. Further, in the 90-degree optical hybrid interferometer, it is desirable to have the optical length in each optical path to be identical from input to output in order to meet the skew characteristic requirement. That is, the crossing angle and the optical path length will be restricted in such configurations, and because the more crossing parts the more redundant and complicated the layout of an optical waveguide will be, therefore not only to compromise the design flexibility to realize the output port arrangement of the OIF standard, but also the chip size becomes large.

In contrast, an example of the effect of the present invention is to provide an optical waveguide device configured with an optical circuit capable of miniaturizing a chip size by reducing crossing parts of optical waveguide arms, and the manufacturing method of such optical waveguide device while realizing an output port arrangement of the OIF standard.

And another example of the effect of the present invention is to provide a 90-degree optical hybrid interferometer of an optical circuit composition reducing the crossing parts of an optical waveguide arms while realizing an output port arrangement of the OIF standard.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

The invention claimed is:

1. An optical waveguide device comprising:

an optical waveguide circuit, for outputting an optical signal which is inputted from a first input terminal to which a first waveguide is connected, and is branched into a first to a fourth optical paths, from ordered arrayed from a first to a fourth output terminals, and for outputting an optical signal which is inputted from a second input terminal to which a second waveguide is connected, and is branched into a fifth to an eighth optical paths, from ordered arrayed from a first to fourth output terminals, wherein said optical waveguide circuit comprises:

an optical circuit for giving a phase difference of π, π/2, 3π/2, 0, π, π/2, 3π/2 to optical signals which travel along said second to said eighth optical paths respectively to an optical signal which transmits said first optical path; and an optical coupler for multiplexing optical signals which travel along said first to said fifth optical paths, optical signals which travel along said second to said sixth optical paths, optical signals which travel along said third to said seventh optical paths, and optical signals which travel along said fourth to said eighth optical paths respectively, and outputting to said first to said fourth output terminals respectively; and wherein said optical waveguide circuit is arranged in order to have said first to said fourth output terminals of each circuit to be arrayed as mentioned above; and said first and said second waveguides do not cross until an optical signal is inputted to said first and said second input terminals.

2. The optical waveguide device according to claim 1, wherein said optical waveguide circuit comprises:

a first and a second optical waveguide arms for transmitting said branched first optical signal respectively;

a third and a fourth optical waveguide arms for transmitting said branched second optical signal respectively;

a first optical coupler for outputting a first and a second interference signals having a phase difference of π respectively by combining a pair of optical signal which transmits said first and said third optical waveguide arms; and a second optical coupler for outputting a third and a fourth interference signals having a phase difference of π respectively by combining a pair of optical signal which transmits said second and said fourth optical waveguide arms; wherein said first to said fourth interference signals are outputted from said first to said fourth output parts respectively;

an optical path difference is set to either pair of said first and said second optical waveguide arms or pair of said third and said fourth optical waveguide arms; and a value of said optical path length difference and a value of phase difference according to phase conversion characteristics which each said first and said second optical couplers have are set to said first and said third interference signals in order to have said second and said fourth interference signals to have a phase difference of +π/2 respectively.

3. The optical waveguide device according to claim 1, wherein
TE (Transverse Electric) and TM (Transverse Magnetic) signals which are separated polarized waves are inputted respectively as said first optical signal at said first interferometer and as second optical signal at said second interferometer; and
one and the other of the branched optical signals are inputted as said second signal light at said first interferometer and said first optical signal at said second interferometer, respectively.

4. The optical waveguide device according to claim 2, wherein an optical path length difference is set to a pair of said third and said fourth optical waveguide arms.

5. The optical waveguide device according to claim 2, wherein said first and said second optical couplers are each configured with a Mach-Zehnder interferometer.

6. An optical waveguide device manufacturing method comprising the steps of:
forming a first clad layer on a substrate;
laminating a core layer on said first clad layer;
forming a core by patterning said core layer;
covering said core with a second clad layer having the same refractive index as said first clad layer; wherein:
said patterning of said core layer is performed with a patterning mask and compose a core pattern of:
optical waveguide circuits, for outputting an optical signal inputted from a first input terminal with a first waveguide being connected to from an ordered arrayed first to a fourth output terminals by having branched into a first to a fourth optical paths, and for outputting an optical signal inputted from a second input terminal with a second waveguide being connected to from an ordered arrayed first to fourth output terminals by having branched into a fifth to an eighth optical paths, respectively; and wherein
said first and said second optical waveguides comprise:
an optical circuit for giving a phase difference of $\pi$, $\pi/2$, $3\pi/2$, 0, $\pi$, $\pi/2$, $3\pi/2$ to optical signals which are transmitted along said second to said eighth optical paths respectively to an optical signal which travel along said first optical path;
an optical coupler for multiplexing optical signals which travel along said first to said fifth optical paths, optical signals which travel along said second to said sixth optical paths, optical signals which travel along said third to said seventh optical paths, and optical signals which travel along said fourth to said eighth optical paths respectively, and outputting to said first to said fourth output terminals respectively; and wherein
said optical waveguide circuit is arranged in order to have said first to said fourth output terminals of each circuit to be arrayed as mentioned above; and
said first and said second waveguides have a configuration of not to cross until an optical signal is inputted to said first and said second input terminals.

7. The optical waveguide device manufacturing method according to claim 6, wherein
said optical waveguide circuit comprises:
a first and a second optical waveguide arms for transmitting said branched first optical signal respectively;
a third and a fourth optical waveguide arms for transmitting said branched second optical signal respectively;
a first optical coupler for outputting a first and a second interference signals having a phase difference of $\pi$ respectively by combining a pair of optical signal which transmits said first and said third optical waveguide arms; and
a second optical coupler for outputting a third and a fourth interference signals having a phase difference of $\pi$ respectively by combining a pair of optical signal which transmits said second and said fourth optical waveguide arms; wherein
said first to said fourth interference signals are configured to output from said first to said fourth output parts respectively;
an optical path difference is set to either pair of said first and said second optical waveguide arms or pair of said third and said fourth optical waveguide arms; and
a value of said optical path length difference and a value of phase difference according to phase conversion characteristics which each said first and said second optical couplers have are set to said first and said third interference signals in order to have said second and said fourth interference signals to have a phase difference of $+\pi/2$ respectively.

8. The optical waveguide device manufacturing method according to claim 6, wherein said patterning of said core layer composes a core pattern of:
said first optical signal at said first interferometer and said second optical signal at said second interferometer are inputted respectively; and
one and the other of the branched optical signals which is branched into two are inputted as said second signal light at said first interferometer and said first optical signal at said second interferometer, respectively.

9. The optical waveguide device manufacturing method according to claim 7, wherein an optical path length difference is set to a pair of said third and said fourth optical waveguide arms.

10. The optical waveguide device manufacturing method according to any one of claim 7, wherein said first and said second optical couplers are each configured with a Mach-Zehnder interferometer.

* * * * *